(12) United States Patent
Currans

(10) Patent No.: US 6,927,872 B2
(45) Date of Patent: Aug. 9, 2005

(54) DATA ACQUISITION SYSTEM AND METHOD USING ANSWER FORMS

(75) Inventor: Kevin G. Currans, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 580 days.

(21) Appl. No.: 09/916,044

(22) Filed: Jul. 25, 2001

(65) Prior Publication Data

US 2003/0020963 A1 Jan. 30, 2003

(51) Int. Cl.[7] .............................................. G06K 15/00
(52) U.S. Cl. ....................... 358/1.15; 358/452; 358/488
(58) Field of Search ................................. 358/474, 1.15, 358/1.14, 404, 444, 452, 453, 488; 382/295, 296, 297

(56) References Cited

U.S. PATENT DOCUMENTS

| | | | | |
|---|---|---|---|---|
| 4,486,180 A | | 12/1984 | Riley ........................... | 434/65 |
| 4,591,904 A | * | 5/1986 | Urabe .......................... | 358/75 |
| 5,272,322 A | * | 12/1993 | Nishida ........................ | 235/462 |
| 6,385,348 B1 | * | 5/2002 | Harada ......................... | 382/284 |
| 6,542,491 B1 | * | 4/2003 | Tari ............................ | 370/338 |

FOREIGN PATENT DOCUMENTS

WO          WO 01/35271         *  5/2001      ........... G06F/17/30

* cited by examiner

*Primary Examiner*—Jerome Grant, II

(57) ABSTRACT

A system and method are provided for acquiring data in a computer system. The present system and method provide a distinct advantage in that a local printer/scanner is employed to perform data acquisition to a central server or other system, etc. In one embodiment, the present system includes a processor circuit having a processor and a memory. Stored on the processor and executable by the memory is scan/correction logic. The scan/correction logic includes logic to obtain a set of coordinates of a response area on a digital form and logic to transmit the coordinates to a scanning apparatus to scan a hardcopy form at the coordinates to determine a response recorded thereon. The hardcopy form is associated with the digital form. Finally, the scan/correction logic includes logic to store the response received from the scanner/printer apparatus in an answer file in the memory.

12 Claims, 7 Drawing Sheets

Answer Form

| | | | | | | | | | | |
|---|---|---|---|---|---|---|---|---|---|---|
| 1. | ☐A | ■B | ☐C | ☐D | | 13. | ☐A | ■B | ☐C | ☐D |
| 2. | ☐A | ☐B | ☐C | ☐D | | 14. | ☐A | ☐B | ☐C | ■D |
| 3. | ☐A | ☐B | ■C | ☐D | | 15. | ☐A | ☐B | ■C | ☐D |
| 4. | ☐A | ■B | ☐C | ☐D | | 16. | ■A | ■B | ☐C | ☐D |
| 5. | ☐A | ☐B | ■C | ☐D | | 17. | ☐A | ☐B | ■C | ☐D |
| 6. | ■A | ☐B | ☐C | ☐D | | 18. | ■A | ☐B | ☐C | ☐D |
| 7. | ■A | ☐B | ☐C | ☐D | | 19. | ■A | ☐B | ☐C | ☐D |
| 8. | ☐A | ☐B | ☐C | ■D | | 20. | ☐A | ☐B | ☐C | ■D |
| 9. | ☐A | ☐B | ■C | ☐D | | 21. | ☐A | ☐B | ■C | ☐D |
| 10. | ☐A | ■B | ☐C | ☐D | | 22. | ☐A | ■B | ☐C | ☐D |
| 11. | ☐A | ☐B | ■C | ☐D | | 23. | ☐A | ☐B | ■C | ☐D |
| 12. | ☐A | ■B | ☐C | ☐D | | 24. | ☐A | ■B | ☐C | ☐D |

FIG. 2

Answer Form

| | | | | | | | | | |
|---|---|---|---|---|---|---|---|---|---|
| 1. | ☐A | ■B | ☐C | ☐D | 13. | ☐A | ■B | ☐C | ☐D |
| 2. | ☐A | ☒B | ☐C | ☐D | 14. | ☐A | ☐B | ☐C | ■D |
| 3. | ☐A | ☐B | ■C | ☐D | 15. | ☐A | ☐B | ■C | ☐D |
| 4. | ☐A | ■B | ☐C | ☐D | 16. | ☒A | ■B | ☐C | ☐D |
| 5. | ☐A | ☐B | ■C | ☐D | 17. | ☐A | ☐B | ■C | ☐D |
| 6. | ■A | ☐B | ☒C | ☐D | 18. | ■A | ☐B | ☐C | ☐D |
| 7. | ■A | ☐B | ☐C | ☐D | 19. | ■A | ☐B | ☐C | ☐D |
| 8. | ☐A | ☐B | ☐C | ■D | 20. | ☐A | ☒B | ☐C | ■D |
| 9. | ☐A | ☒B | ■C | ☐D | 21. | ☐A | ☐B | ■C | ☐D |
| 10. | ☐A | ■B | ☐C | ☐D | 22. | ☐A | ■B | ☐C | ☐D |
| 11. | ☐A | ☐B | ■C | ☐D | 23. | ☒A | ☐B | ■C | ☐D |
| 12. | ☐A | ■B | ☐C | ☐D | 24. | ☐A | ■B | ☐C | ☐D |

FIG. 3

```
<form values>                      ╱─221
        <form identifier code> 134285 <form identifier code>
        <response area>    ╱─223
                <location> x,y <end location>
                <shape> square <end shape> ◄──── 226
                <size> .125 <end size> ◄────────229
                <value> [unfilled] <end value> ◄──── 233
        <end response area>
        <response area>
                <location> x,y <end location>
                <shape> square <end shape>
                <size> .125 <end size>
                <value> [unfilled] <end value>
        <end response area>
        <response area>         ╱─213a
                <response series> series1 <response series>
                <expected response> filled <end expected response>
                <location> x,y <end location>
                <shape> square <end shape>          ╲─236
                <size> .125 <end size>
                <value> [unfilled] <end value>
        <end response area>
        <response area>
                <response series> series1 <response series>
                <expected response> unfilled <end expected response>
                <location> x,y <end location>
                <shape> square <end shape>
                <size> .125 <end size>
                <value> [unfilled] <end value>
        <end response area>
<end form values>
```

FIG. 4

DATA ACQUISITION SYSTEM AND METHOD USING ANSWER FORMS

TECHNICAL FIELD

The present invention is generally related to the field of data acquisition and, more particularly, is related to a system and method for data acquisition using hardcopy forms.

BACKGROUND OF THE INVENTION

The advent of the information age has been made possible by computer technology. Before such time, information processing and handling was performed by hand on paper. For example, large information data systems were kept in order using elaborate filing systems. Both private entities and government agencies have large amounts of data information to be stored for one purpose or another. For example, government agencies such as the internal revenue service must keep records relating to millions of individual taxpayers. Large corporations routinely keep financial records for millions of transactions.

Computer systems have been indispensable in reducing the amount of menial labor surrounding data acquisition and record keeping. Currently, computer systems can maintain large databases associated with a particular organizations operation. For example, the internal revenue service can maintain tax data for each taxpayer on a computer system in a manner that facilitates a more efficient organization and access for agency purposes. In many organizations, computer storage devices such as hard disks and the like are replacing filing cabinets, thereby reducing the need for large space requirements for record keeping.

Along with current data storage and processing systems has come a need for data acquisition. In many cases, multiple workers are employed to enter data into large databases, etc. Often times individuals may fill out forms that are read into a database using large form reading devices. This is inefficient in that a large number of workers are still employed to perform the data acquisition function.

Also, current systems generally require individuals to have direct access to the data storage and processing systems to enter information. This restricts an individual's ability to perform data acquisition in remote areas.

SUMMARY OF THE INVENTION

In light of the forgoing, the present invention provides for a system and a method for acquiring data in a computer system. The present invention provides a distinct advantage in that local printers/scanners in a client are employed to perform data acquisition to collect data that is stored at a central server. Consequently, the data acquisition function is distributed among a plurality of users rather than requiring an organization to employ a number of individuals to perform data acquisition functions in a centralized approach.

In one embodiment, the present invention provides for a system in a computer system that includes a processor circuit having a processor and a memory. Stored on the processor and executable by the memory is scan logic. The scan logic includes logic to obtain a set of coordinates of a response area on a digital form and logic to transmit the coordinates to a scanning apparatus to scan a hardcopy form at the coordinates to determine a response recorded thereon. The hardcopy form is associated with the digital form. Finally, the scan logic includes logic to store the response received from the scanning apparatus in an answer file in the memory. The scan logic may also include correction logic to correct any incorrectly filled response areas in the case that the hardcopy form is a test, etc.

The present invention further includes a method for acquiring data in a computer system. The method comprises, for example, the steps of obtaining a set of coordinates of a response area from a digital form; scanning a physical response area with a scanning apparatus on a hardcopy form at the set of coordinates to determine a response recorded thereon, the hardcopy form being associated with the digital form; and storing the response in an answer file in a memory in the computer system.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 2 is a drawing of a hardcopy form used in the data acquisition system of FIG. 1;

FIG. 3 is a drawing of the hardcopy form of FIG. 2 with correction markings according to an aspect of the present invention;

FIG. 4 is an example of layout component of a digital form used in the data acquisition system of FIG. 1;

DETAILED DESCRIPTION OF THE INVENTION

Figure 1:
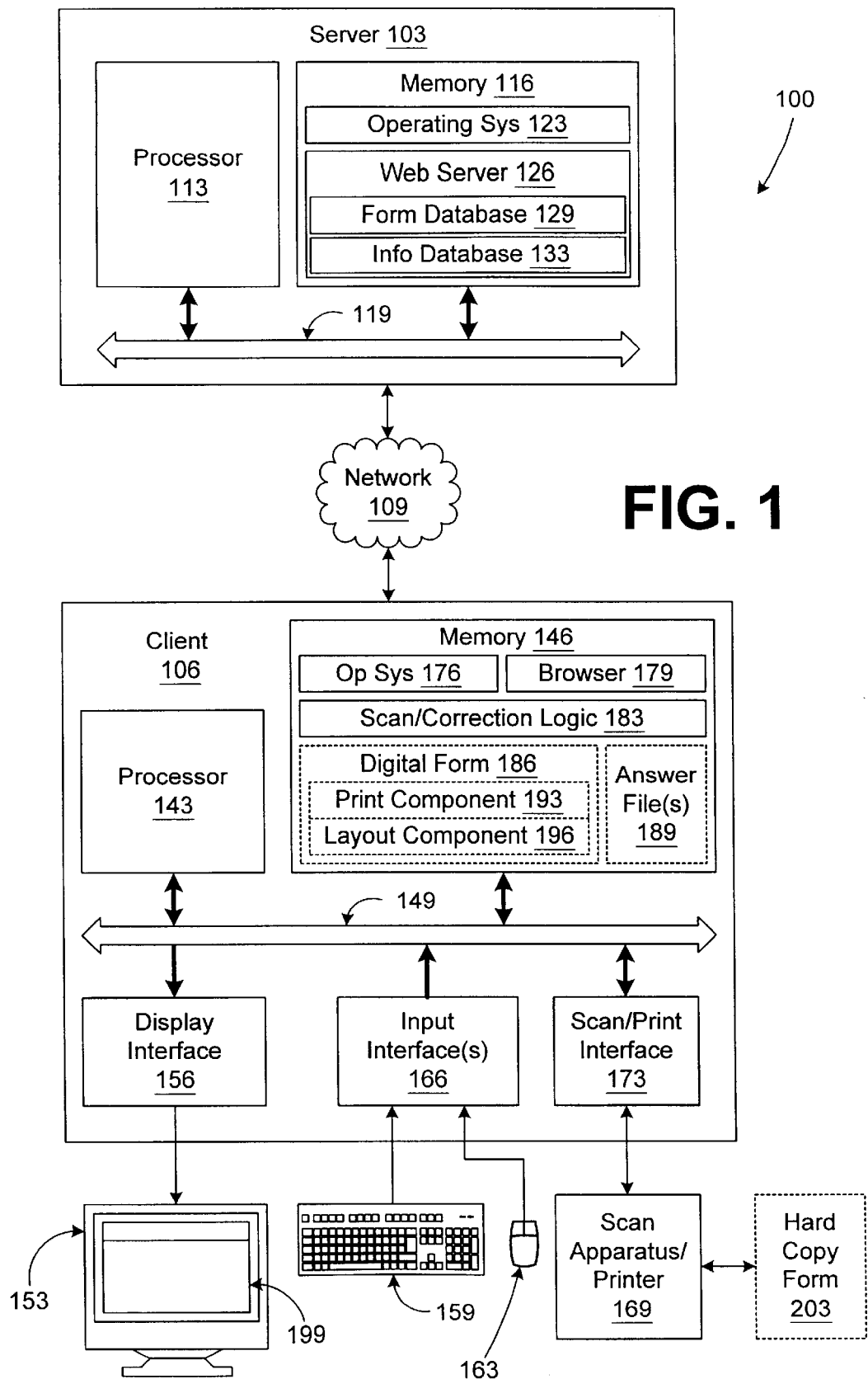
FIG. 1 is a functional block diagram of a data acquisition system according to an embodiment of the present invention.

With reference to FIG. 1, shown is a data acquisition system 100 according to an embodiment of the present invention. The data acquisition system 100 is employed to amass data from hardcopy forms as will be discussed. To describe the data acquisition system 100, first a physical description is provided followed by discussion of the operation of the data acquisition system 100. The data acquisition system 100 includes a server 103 and a client 106, both of which are coupled to a network 109. The server 103 includes a processor 113 and a memory 116 that are coupled to a local interface 119. The local interface 119 may comprise, for example, a data bus with an accompanying control bus as is generally known by those with ordinary skill in the art.

Stored on the memory 116 and executable by the processor 113 are an operating system 123 and a web server 126. The web server 126 may also be, for example, a different type of server beyond those that interface with the World Wide Web as is generally known by those with ordinary skill in the art. The web server 126 includes a form database 129 and an information database 133.

The client 106 also includes a processor 143 and a memory 146, both of which are coupled to a local interface 149. The local interface may be, for example, a data bus with an accompanying control bus as is generally known by those with ordinary skill in the art. The client 106 also includes a display device 153 that is coupled to the local interface 149 by way of a display interface 156. The display device 153 may be, for example, a cathode ray tube (CRT), a liquid crystal display screen, a gas plasma-based flat panel display, indicator lights, light emitting diodes, or other suitable display device. In addition, the client 106 includes a keyboard 159 and a mouse 163, both of which are coupled to the local interface 149 through input interfaces 166. A scanner/printer 169 is also coupled to the local interface 149 by way of a scan/print interface 173. Other user input and output devices that may be employed with the client 106 include, for example, a keypad, touch pad, touch screen, microphone, joystick, or one or more push buttons, etc. User output devices may include indicator lights, speakers, printers, etc.

Stored on the memory 146 and executable by the processor 143 is an operating system 176, a browser 179, and scan/correction logic 183. Also stored on the memory 146 and accessed by the processor 143 for various purposes as will be described is a digital form 186 and one or more answer files 189. Within the digital form 186 are a print component 193 and a layout component 196 as will be described. In addition, when executed by the processor 143, the browser 179 causes a graphical browser 199 to appear on the display device 153 for manipulation by a user as is general known by those with ordinary skill in the art. A hardcopy form 203 may be placed in the scanner/printer 169 and scanned to obtain information therefrom that is then transmitted to the server 103 as will be described.

The network 109 includes, for example, the Internet, wide area networks (WANs), local area networks, or other suitable networks, etc., or any combination of two or more such networks. The server 103 and client 106 are coupled to the network 109 in any one of a number of ways that are generally known by those of ordinary skill in the art to facilitate data communication to and from the network 109. For example, the server 103 and client 106 may be linked to the network 109 through various devices such as, for example, network cards, modems, or other such communications devices. Also, the server 103 and client 106 may be coupled to the network 109 through a local area network and an appropriate network gateway or other arrangements, etc.

In addition, the memories 116 and 146 may include both volatile and nonvolatile memory components. Volatile components are those that do not retain data values upon loss of power. Nonvolatile components are those that retain data upon a loss of power. Thus, the memories 116 and 146 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, each of the processors 113 and/or 143 may represent multiple processors and each of the memories 116 and/or 146 may represent multiple memories that operate in parallel. In such a case, the local interfaces 119 and 149 may be an appropriate network that facilitates communication between any two of the multiple processors or between any processor and any of the memories, etc. The local interfaces 119 and 149 may facilitate memory to memory communication as well. The processors 113/143, memories 116/146, and local interfaces 119/149 may be electrical or optical in nature. Also, the memories 116 and 146 may be magnetic in nature.

Next the operation of the data acquisition system 100 will be described. The hardcopy form 203 includes a number of response areas and a digital form identifier (not shown). The user places the hardcopy form 203 into the scanner/printer 169 and presses an activation button or otherwise manipulates some sort of input mechanism. Alternatively, the scanner/printer 169 may automatically sense the placement of the hardcopy form 203 and will activate itself with no specific manipulation by the user. The scanner/printer 169 may be, for example, a Hewlett-Packard Deskjet 970C manufactured by Hewlett-Packard Company headquartered in Palo Alto, Calif., or comparable device.

In response to the manipulation of the activation button or other input mechanism, the scanner/printer 169 scans the digital form identifier (not shown) on the hardcopy form 203. The digital form identifier is then made available on the local interface 149 through the scan/printer interface 173. The digital form identifier indicates a specific form type. The scan correction logic 183 is executed by the processor 143 to request a digital form 186 from the web server 126 based upon the digital form identifier. In response the web server 126 searches the form database 129 and obtains the desired digital form 186 that matches the hardcopy form 203 from a number of digital forms 186 stored therein. In particular, the web server 126 locates the desired digital form 186 with a digital form identifier that matches the digital form identifier received from the scanner/printer 169.

Once the digital form 186 that matches with the hardcopy form 203 is found in the form database 129, the web server 126 transmits the digital form 186 to the client 106 via the network 109. Upon receiving the digital form 186, the client 106 stores it in the memory 146. The print component 193 of the digital form 186 provides the information necessary for a printing device to print out the hardcopy form 203 itself. Consequently, the printer/scanner 169 may be employed to print the hardcopy form 203. In this respect, the print component 193 may comprise, for example, a document file that is employed within a word processor or form processing program. The layout component 196 contains information that allows the scan/correction logic 183 to perform a scan of the hardcopy form 203 that has been filled out by a user to determine responses to various questions, etc., by scanning the response areas on the hardcopy form 203.

When the digital form 186 has been received by the client 106, the scan/correction logic 183 accesses the layout component 196 to direct the scanner/printer 169 to scan various response areas on the hardcopy form 203. The responses recorded in these response areas are stored into an answer file 189 in the memory 146. Once all of the responses have been determined, the answer file 189 is transmitted to the web server 126. In response, the web server 126 stores the information contained within the answer file 189 within the information database 133. Note that the answer file 189 itself may be stored in the information database 133 as well. The scan/correction logic 183 also directs the scanner/printer 169 to mark any incorrect responses on the hardcopy form 203 where applicable. A user can also view the filled hardcopy form 203 using the browser 179.

The data acquisition system described above provides distinct advantages to users. Specifically, a user may place the hardcopy form 203 into the scanner/printer 169 and press a button to transmit the data to the server 103 without any further user intervention. In the case that the hardcopy form 203 includes answers to a test, the user can have the form corrected and the answers registered in the client 106 automatically without any further intervention. In this manner, the user can maintain a record of the data in the form of the hardcopy form 203 while at the same time providing such information to the server 103 with little user intervention. In this manner, multiple clients 106 across a wide geographical region can provide data information to a central server 103 with relative ease, thereby eliminating the potential possibility of user mistakes in reporting data from the multiple locations, provided that the data is entered correctly on the hardcopy forms 203. The hardcopy forms 203 also provide a permanent record of the information entered that may be stored separately. In addition, the data acquisition system 100 accommodates many different types of hardcopy forms 203.

With respect to FIG. 2, shown is hardcopy form 203 according to an aspect of the present invention. The hardcopy form 203 includes a number of response areas 206. Each of the response areas may be expressed, for example, in terms of Cartesian or rectangular coordinates X and Y on the hardcopy form 203 with respect to an origin O and a particular shape or area. The origin O delineates the position (0,0) on the two dimensional plane. In the case of the hardcopy form 203, the origin O is identified as the lower left hand corner as shown, for example, although other positions on the hardcopy form 203 may be employed as the origin O. The response areas 206 may encompass a given shape or area of the hardcopy form 203 that may vary from form to form. The hardcopy form 203 also includes a digital form identifier 209 in the upper left-hand corner, although the digital form identifier 209 may be placed anywhere on the hardcopy form 203.

The digital form identifier 209 may be, for example, a bar code or other recognizable image. The digital form identifier 209 may be created with any color ink, invisible ink, or other type of mark that is readable by the scanner/printer 169. The digital form identifier 209 may be created in a manner similar to that discussed in U.S. patent application entitled "Serialized Original Print", filed on Aug. 17, 2000 under attorney docket number 10001686, assigned Ser. No. 09/641,618. The response areas 206 may be grouped into a response series 213. The response series 213 includes a number of the response areas 206 that represent, for example, mutually exclusive answers, where one of the response areas 206 in the response series 213 represents a "correct" answer or a single option among the possible choices in the response series 213. Alternatively, the response series 213 may have a number of correct choices, etc. Also, the response areas 206 may not be part of a response series 213, rather they might be used to indicate a single answer to a specific question or to indicate a specific circumstance, etc.

Reference to FIG. 3, shown is a corrected hardcopy form 203a according to an aspect of the present invention. The corrected hardcopy form 203a includes "no answer" marks 216 and "wrong answer" marks 219. The no answer marks 216 and the wrong answer marks 219 are recorded onto the hardcopy form 203a as directed by the scan/correction logic 183 (FIG. 1) as will be discussed. The no answer mark 216 is written over a correct answer within a response series 213 that has no mark for any of the response areas 206 within the response series 213. The wrong answer mark 219 is written over the correct response area 206 for which there has been a wrong answer recorded or more than one answer recorded or other situation as is generally known by those with ordinary skill in the art.

With reference to FIG. 4, shown is an example of the layout component 196 of the digital form 186 (FIG. 1) according to an aspect of the present invention. The layout component 196 includes a form identifier code 221 that corresponds to the digital form identifier 209 (FIG. 2). The form identifier code 221 is used to associate the layout component 196 with the hardcopy form 203. The layout component 196 also includes a number of parameters that are associated with each response area 206 (FIG. 2). The response areas 206 are represented, for example, by a pair of response area tags 206a within which the parameters associated with the respected response area 206 are embedded. The layout component 196 may be, for example, an extensible markup language (XML) file or other such data structure as is generally known by those with ordinary skill in the art.

Among the parameters associated with each respected response 206 are a pair of coordinates 223 that are the X and Y coordinates that locate the response area 206 relative to the origin 0 (FIG. 2). Also included are a shape value 226 and a size value 229 that indicate the shape and size of the response area 206 in question. A response area value 233 is indicated as unfilled as a default given that the hardcopy form 203 is blank, for example, when provided to the user.

The layout component 196 also includes a response series identifier 213a that corresponds with a given response series 213 (FIG. 2) on the hardcopy form 203. The response series identifier 213a indicates that a particular response area 206a is included within a response series 213. The response areas 206a associated with a response series 213a include, for example, an expected response field 236 that indicates, for example, a predefined correct answer for that particular response area 206a.

The layout component 196 provides, for example, a format that may be copied for use as the answer file 189. In particular, the response areas 206a may be copied into an answer file 189 that is then altered based on the user input to reflect the state of the user altered hardcopy form 203. Specifically, a set of tags may be employed to indicate an actual response entered by a user. For example, a particular response may be written into each response area 206a such as "<actual response> filled <end actual response>". Such an actual response may be compared with any corresponding expected response field 236 to determine whether the actual response is correct, etc.

Figure 5:
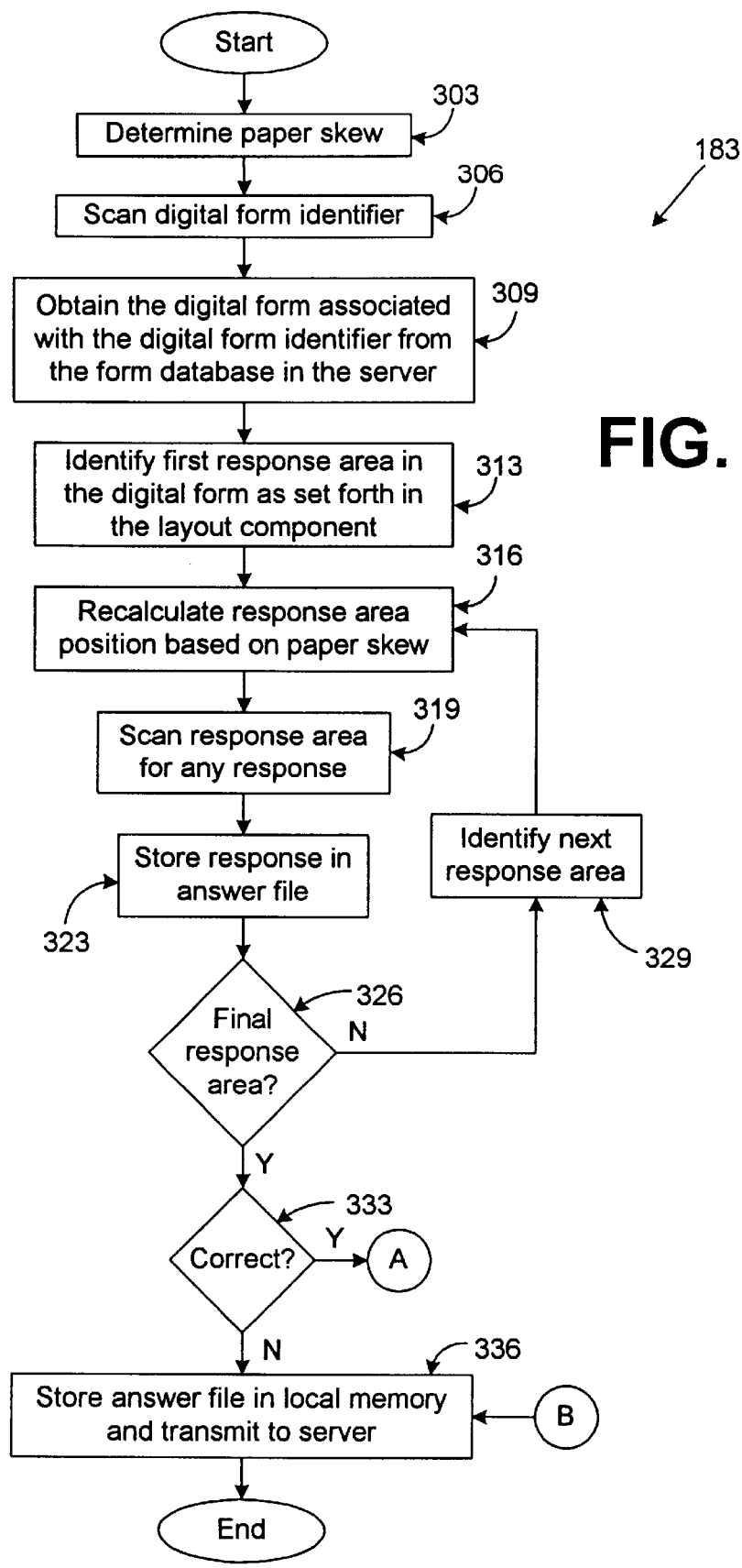
FIG. 5 is a flow chart of scan/correction logic executed on a client in the data acquisition system of FIG. 4.

With reference to FIG. 5, shown is a flow chart of the scan/correction logic 183 that is stored in the memory 146 (FIG. 1) and executed by the processor 143 (FIG. 1) within the client 106 (FIG. 1). Alternatively, the flow chart of FIG. 5 may be viewed as depicting a method executed in the client 106. Beginning with block 303, the scan/correction logic 183 determines the paper skew of the hardcopy form 203 (FIG. 1) as it placed within the scanner/printer 169 (FIG. 1). In particular, the scan/correction logic 183 directs the scanner/printer 169 to determine the paper skew using the scanner capability to detect the edges of the hardcopy form 203 relative to a fixed point as is generally understood by those with ordinary skill in the art.

Then, the scan/correction logic 183 moves to block 306 in which the scanner/printer 169 is directed to scan the digital form identifier 209 (FIG. 2) on the hardcopy form 203. Once the digital form identifier 209 has been received from the scanner/printer 169 in block 306, the scan/correction logic 183 moves to block 309 in which a request for a digital form 186 (FIG. 1) is transmitted to the web server 126 (FIG. 1). The request includes the digital form identifier 209 obtained in block 306. Based on the digital form identifier 209 supplied from the client 106, the web server 126 searches the form database 129 (FIG. 1) to find a digital form 186 that corresponds thereto. Once found, the web server 126 then transmits the digital form 186 requested to the client 106.

Next in block 313, the first response area 206 is identified in the digital form 186 as set forth by the layout component 196 (FIG. 1) of the digital form 186. Thereafter, in block 316, the scan/correction logic 183 recalculates the position of the identified response area 206 (FIG. 2) for the digital form 186 obtained in block 309 based upon the paper skew determined in block 303. Then, in block 319, the scan/correction logic 183 directs the scanner/printer 169 to scan the identified response area 206 for a particular response. In particular, it is determined whether the response area 206 has been filled or unfilled with an appropriate mark using, for example, a pencil or other instrument. In block 323, the scan/correction logic 183 stores the response obtained in the scan of block 319 in an answer file 189 (FIG. 1).

Thereafter, in block 326, the scan/correction logic 183 determines whether the final response area 206 has been scanned and the scanned response stored accordingly. If not, then the scan/correction logic 183 moves to block 329 in which the next response area 206 is identified. The scan/correction logic 183 then reverts back to block 316 as shown.

Assuming that the scan/correction logic 183 has processed the final response area 206 in block 326, then the scan/correction logic 183 moves to block 333. In block 333 a determination is made as to whether there is any correction to be performed on the hardcopy form 203. This may be determined by examining appropriate tags in the layout component 196 (FIG. 1) of the digital form 186 that indicate whether the hardcopy form 203 is to be corrected. If so then the scan/correction logic 183 moves to connector A as shown. Otherwise, the scan/correction logic 183 progresses to block 336 in which the answer file 189 that has been created is stored in the local memory 146 and is also transmitted to the server 103. The responses recorded in the answer file 189 may be included, for example, in the information database 133.

Figure 6:
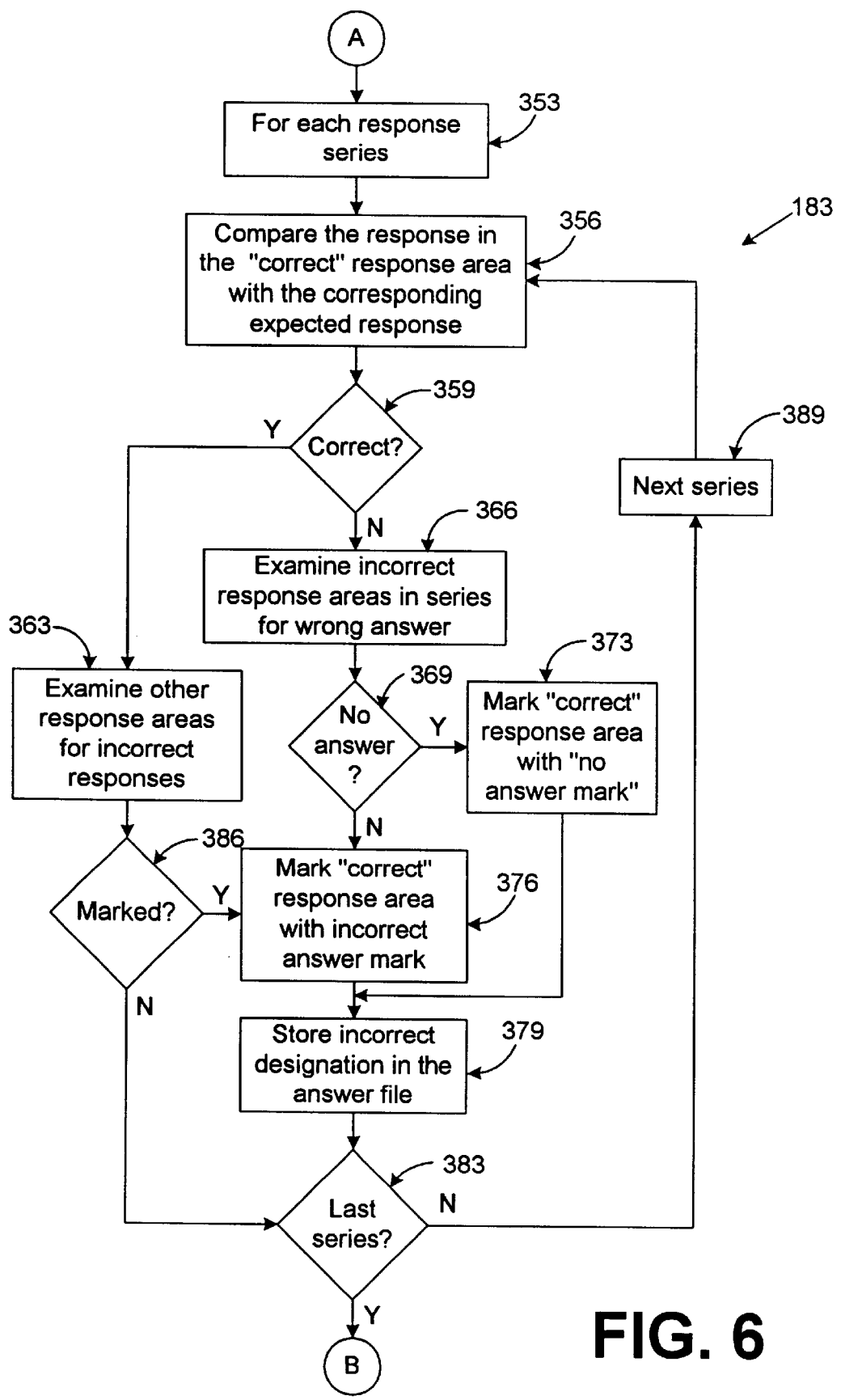
FIG. 6 is a flow chart of correction logic executed as a portion of the scan/correction logic of FIG. 5.

With reference to FIG. 6, shown is a further portion of the scan/correction logic 183 according to an aspect of the present invention. The flowchart of FIG. 6 represents the portion of the scan/correction logic 183 that is executed when a hardcopy form 203 (FIG. 1) is to be corrected as determined in block in block 333 (FIG. 5). From the connector A, the scan/correction logic 183 moves to block 353 in which a for/next loop is commenced for each response series 213 (FIG. 2) in the current answer file 189 (FIG. 1). It is assumed, for example, that each response series 213 includes one correct answer and at least one incorrect answer.

In block 356 the response that was recorded in the "correct" one of the response areas 206 (FIG. 2) is compared with the corresponding expected response 236 (FIG. 4). Then, in block 359, if the recorded response is the same as the expected response 236, then the scan/correction logic 183 proceeds to block 363. Otherwise, the scan/correction logic 183 moves to block 366. Assuming that an incorrect answer was detected in block 359, then the scan/correction logic 183 takes steps to determine whether an incorrect answer was recorded or if no answer was recorded for the response series 213. In this regard, the scan/correction logic 183 examines the "incorrect" response areas 206 in the response series 213 as recorded in the answer file 189 (FIG. 1) for any wrong answers. The existence of a wrong answer may be determined, for example, by comparing an actual response with an expected response 236 for each response area 206.

Thereafter, in block 369 the scan/correction logic 183 determines whether there is no answer recorded in the response series 213. If so, then the scan/correction logic 183 proceeds to block 373 in which the "correct" response area 206 is marked with a "no answer" mark 216 (FIG. 3). If not, then the scan/correction logic 183 proceeds to block 376 in which the "correct" response area 206 is marked with a "wrong answer" mark 219 (FIG. 3). From blocks 373 or 376, the scan/correction logic 183 proceeds to block 379 to store an incorrect designation in the answer file 189. Note that this may be accomplished by including a correct/incorrect designation in the answer file 189 using appropriate tags, etc. Thereafter, the scan/correction logic 183 moves to block 383.

Referring back to block 363 where a correct recorded answer was previously detected in block 359, the scan/correction logic 183 examines the other response areas 206 in the response series 213 to determine whether two response areas 206 have been incorrectly marked. This prevents a user from slyly marking all possible response areas 206 within a response series 213 to obtain a correct answer. If in block 386 one of the "incorrect" response areas 206 is marked in addition to the "correct" response area, then the scan/correction logic 183 moves to block 376 as shown. Otherwise, the scan/correction logic 183 moves to block 383.

In block 383, the scan/correction logic 183 determines if the last response series 213 has been corrected. If not, then the scan/correction logic 183 proceeds to block 389 in which the next response series 213 is identified. Thereafter, the scan/correction logic 183 reverts back to block 356 as shown. Otherwise the scan/correction logic 183 proceeds to connector B to block 336 (FIG. 5) accordingly.

Although the scan/correction logic 183 of the present invention is embodied in software executed by general purpose hardware as discussed above, as an alternative the scan/correction logic 183 may also be embodied in dedicated hardware or a combination of software/general purpose hardware and dedicated hardware. If embodied in dedicated hardware, the scan/correction logic 183 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 5 and 6 show the architecture, functionality, and operation of an implementation of the scan/correction logic 183. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. It is understood that all such variations are within the scope of the present invention. Also, the flow charts of FIGS. 5 and 6 are relatively self-explanatory and are understood by those with ordinary skill in the art to the extent that software and/or hardware can be created by one with ordinary skill in the art to carry out the various logical functions as described herein.

Also, the scan/correction logic 183 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the scan/correction logic 183 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 7:
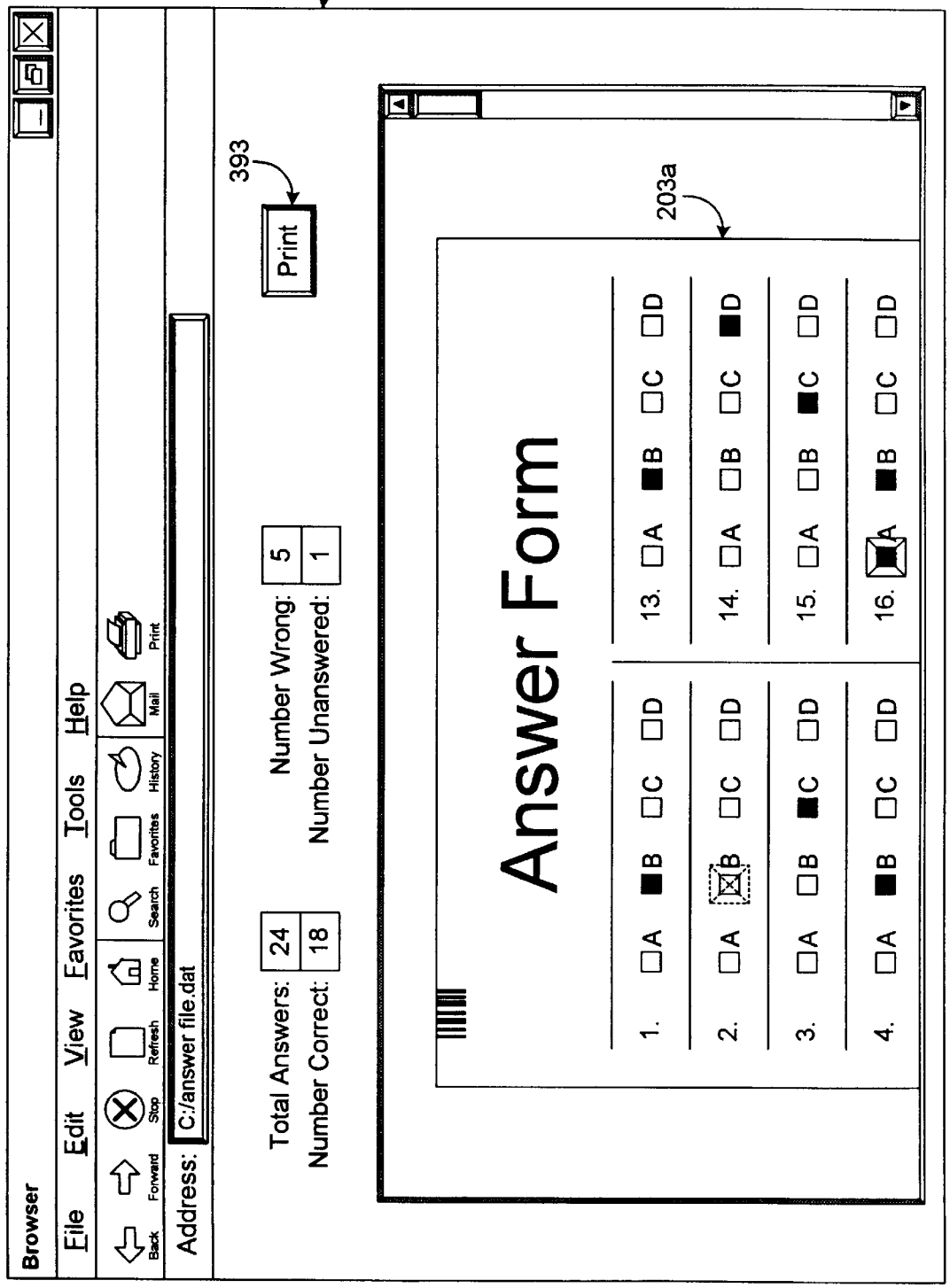
FIG. 7 is a drawing of a graphical user interface generated by the data acquisition system of FIG. 1 graphically depicting a digital form.

With reference to FIG. 7, shown is the graphical browser 199 as depicted on the display device 153 (FIG. 1) according to an aspect of the present invention. The graphical browser 199 is generated by the browser 179 as is generally known by those with ordinary skill in the art. The browser 179 may be employed to provide a graphical depiction of the corrected hardcopy form 203a. Specifically, the corrected hardcopy form 203a is shown within a display box within the graphical browser 199. In addition, other functionality can be provided within the context of the browser 179 such as, for example, a printing function that may be implemented by a user to print the corrected hardcopy form 203a when viewed within the graphical browser 199. The printing function may be executed by manipulating a print button 393, for example, using a mouse or keyboard, etc. The corrected hardcopy form 203a may be viewed using means other than the browser 179, such as, various word processing software or other such software systems. The depiction of the corrected hardcopy form 203a using the browser 179 provides one example of the various systems that may employed to display the corrected hardcopy form in a similar manner.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

I claim:

1. A method for acquiring data in a computer system, comprising the steps of:

requesting a digital form from a form database upon receiving a digital form identifier from a scanning apparatus;

obtaining a set of coordinates of a response area from the digital form;

scanning a hardcopy form at the set of coordinates with the scanning apparatus to determine a response recorded thereon, the hardcopy form being associated with the digital form;

storing the response in an answer file in a memory in the computer system;

identifying a predefined correct response associated with the response area in the digital form; and comparing the predefined correct response with the response received from the scanning apparatus to determine whether the response is correct.

2. The method of claim 1, further comprising the step of providing the digital form with a print component and a layout component, the layout component including the set of coordinates of the response area.

3. The method of claim 1, further comprising the step of calculating the set of coordinates based upon a skew of the hardcopy form with respect to the scanning apparatus.

4. The method of claim 1, further comprising the step of transmitting the answer file to a server.

5. The method of claim 1, wherein the step of requesting the digital form from a form database upon receiving a digital form identifier from the scanning apparatus further comprises the step of transmitting a request for the digital form to a server, wherein the form database is stored in the server.

6. The method of claim 1, further comprising the step of directing a printing apparatus to mark the response area if the response is not correct.

7. A system for acquiring data in a computer system, comprising:

a processor circuit in the computer system having a processor and a memory;

scan logic stored in the memory and executable by the processor, the scan logic comprising:

logic to request a digital form from a form database upon receiving a digital form identifier from a scanning apparatus;

logic to obtain a set of coordinates of a response area on the digital form;

logic to transmit the coordinates to the scanning apparatus to scan a hardcopy form at the set of coordinates to determine a response recorded thereon, the hardcopy form being associated with the digital form;

logic to store the response received from the scanning apparatus in an answer file in the memory; and correction logic stored on the memory and executable by the processor, the correction logic further comprising:

logic to identify a predefined correct response associated with a response area in the digital form; and logic to compare the predefined correct response with the response received from the scanning apparatus to determine whether the response is correct.

8. The system of claim 7, wherein the scan logic further comprises logic to calculate the set of coordinates based upon a skew of the hardcopy form with respect to the scanning apparatus.

9. The system of claim 7, wherein the scan logic further comprises logic to transmit the answer file to a server.

10. The system of claim 7, wherein the logic to request the digital form from a form database upon receiving a digital form identifier from the scanning apparatus further com prises logic to transmit a request for the digital form to a server, wherein the form database is stored in the server.

11. The system of claim 7, wherein the correction logic further comprises logic to direct a printing apparatus to mark the response area if the response is not correct.

12. The system of claim 7, wherein the correction logic further comprises:

logic to identify a series of response areas;
logic to determine if no response is received for the series of response areas; and
logic to direct a printing apparatus to mark a correct one of the response areas.

\* \* \* \* \*

UNITED STATES PATENT AND TRADEMARK OFFICE
CERTIFICATE OF CORRECTION

PATENT NO.    : 6,927,872 B2
DATED         : August 9, 2005
INVENTOR(S)   : Currans It is certified that error appears in the above-identified patent and that said Letters Patent is hereby corrected as shown below:

Column 2,
Line 40, delete "Fig. 4;" and insert -- Fig. 1; --.

Column 11,
Line 1, delete "for" and insert -- from --.

Signed and Sealed this

Twentieth Day of December, 2005

JON W. DUDAS
*Director of the United States Patent and Trademark Office*